(12) United States Patent
Ogasawara

(10) Patent No.: US 8,422,057 B2
(45) Date of Patent: Apr. 16, 2013

(54) APPARATUS AND METHOD FOR MANUFACTURING THE SAME

(75) Inventor: Taku Ogasawara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 929 days.

(21) Appl. No.: 12/487,475

(22) Filed: Jun. 18, 2009

(65) Prior Publication Data

US 2009/0316204 A1    Dec. 24, 2009

(30) Foreign Application Priority Data

Jun. 20, 2008 (JP) ................. 2008-162303

(51) Int. Cl.
G06F 3/12 (2006.01)
G06K 9/34 (2006.01)

(52) U.S. Cl.
USPC ........... 358/1.15; 382/173; 382/175; 382/176

(58) Field of Classification Search ................ 358/1.15; 382/173, 175, 176
See application file for complete search history.

(56) References Cited

U.S. PATENT DOCUMENTS

2006/0274939 A1* 12/2006 Yamada .................. 382/173

FOREIGN PATENT DOCUMENTS

| JP | 08-137852 A | 5/1996 |
|---|---|---|
| JP | 2004-078752 | 3/2004 |
| JP | 2004-252826 A | 9/2004 |
| JP | 2007-166303 | 6/2007 |
| JP | 2007-176042 A | 7/2007 |
| JP | 2007-189669 A | 7/2007 |
| JP | 2007-233617 A | 9/2007 |
| JP | 2007-331313 | 12/2007 |

* cited by examiner

*Primary Examiner* — Charlotte M Baker
*Assistant Examiner* — Justin Katzwhite
(74) *Attorney, Agent, or Firm* — Canon USA Inc. IP Division

(57) ABSTRACT

An apparatus is provided which includes a storage unit configured to store original data; a determining unit configured to determine whether or not a user who gives an instruction to transmit the original data to another apparatus is the creator of the original data when the original data is transmitted to the other apparatus; and a transmitting unit configured, as a result of the determination by the determining unit, if the user is the creator of the original data, to transmit the original data in a data format that allows editing by the other apparatus; and if the user is not the creator of the original data, to transmit the original data in a data format that disables editing by the other apparatus.

5 Claims, 14 Drawing Sheets

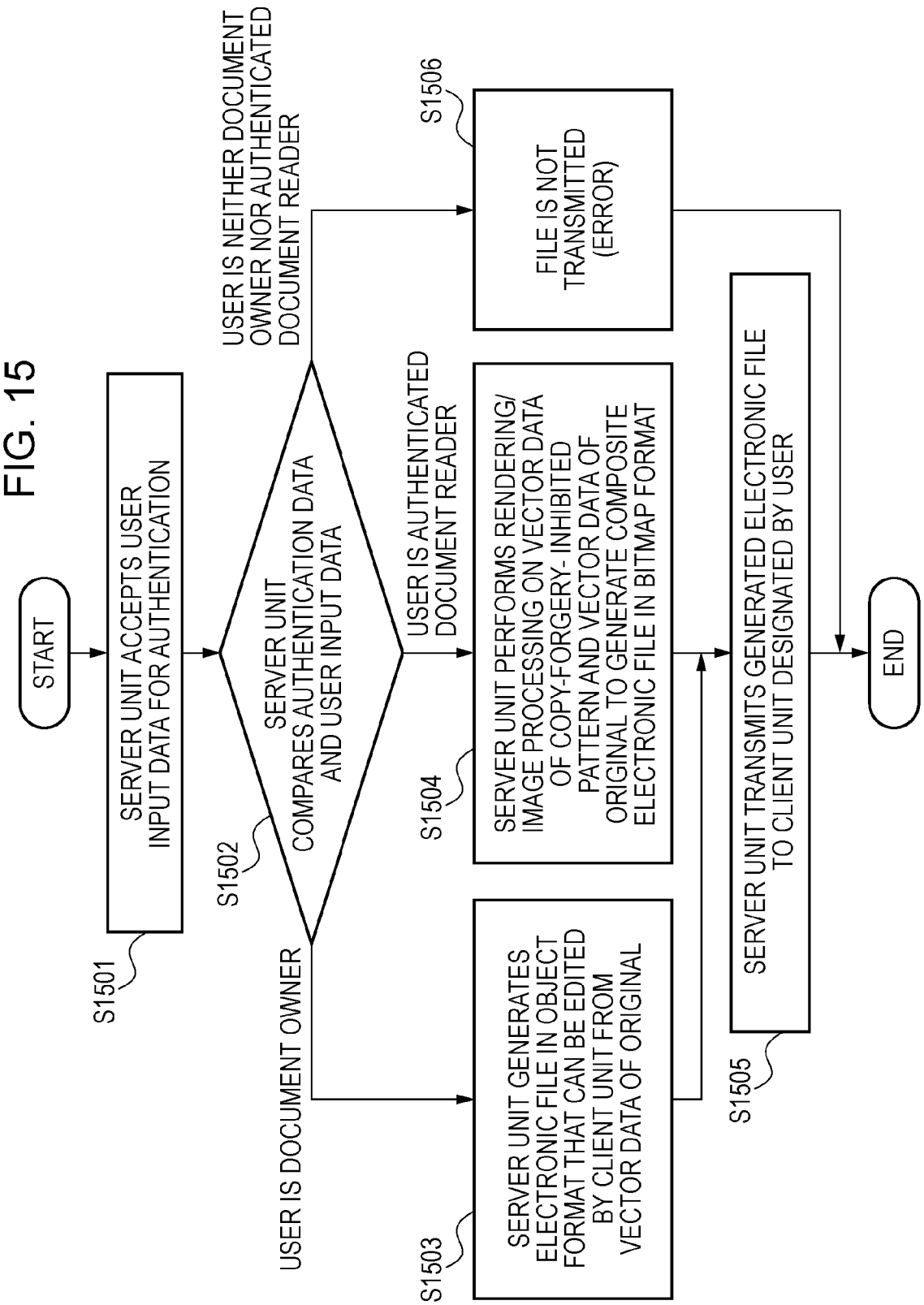

US 8,422,057 B2

APPARATUS AND METHOD FOR MANUFACTURING THE SAME

BACKGROUND OF THE INVENTION

1. Field of the Invention

The present invention relates to an apparatus capable of handling a copy-forgery-inhibited pattern document and a method for controlling the same.

2. Description of the Related Art

In known copy-forgery-inhibited pattern control using access right concerning an image forming apparatus, an information processing apparatus performs copy-forgery-inhibited pattern control using a printer driver (not shown) (refer to Japanese Patent Laid-Open No. 2004-078752).

FIG. 10 shows the configuration of a system for performing the known copy-forgery-inhibited pattern control.

Reference numeral 1001 denotes an administration server, numeral 1002 denotes an information processing apparatus, and numeral 1003 denotes an image forming apparatus.

They are networked over a LAN 1004.

FIG. 11 shows a flowchart of a procedure for copy-forgery-inhibited pattern control by the information processing apparatus 1002 with this system.

The processes of steps S1101 to S1106 in the flowchart are controlled by a CPU (not shown) of the information processing apparatus 1002. Step S1107 is controlled by a CPU (not shown) of the information processing apparatus 1002.

When a user gives a print instruction to the image forming apparatus 1003 from the information processing apparatus 1002 (S1101), first, the information processing apparatus 1002 makes a request to the administration server 1001 for authentication (S1102).

If it is determined in authentication processing (S1103) that the user is registered in the administration server 1001, the information processing apparatus 1002 generates print data in which a copy-forgery-inhibited pattern is added to the original (S1104).

If it is determined in the authentication processing (S1103) that the user is not registered in the administration server 1001, the information processing apparatus 1002 generates print data in which no copy-forgery-inhibited pattern is added to the original (S1105). The information processing apparatus 1002 transmits the generated print data to the image forming apparatus 1003 (S1106). The image forming apparatus 1003 prints the received print data (S1107). Thus, the addition/non-addition of a copy-forgery-inhibited pattern can be controlled using user right.

Furthermore, an authenticated user ID can be embedded in the copy-forgery-inhibited pattern; thus, if the copy-forgery-inhibited pattern document drains, the user can be identified.

There is another known system for changing the output format of a copy-forgery-inhibited pattern document that an image forming apparatus handles (refer to Japanese Patent Laid-Open No. 2007-331313).

FIG. 12 shows the configuration of the known system for copy-forgery-inhibited pattern control.

Reference numeral 1201 denotes an information processing apparatus, numeral 1202 denotes an image forming apparatus having a resolution of 1200 dpi, and numeral 1203 denotes an image forming apparatus having a resolution of 600 dpi.

They are networked over a LAN 1204.

FIG. 13 shows a flowchart of a procedure for copy-forgery-inhibited pattern control by the information processing apparatus 1201 with this system.

The processes of the steps in the flowchart are controlled by a CPU (not shown) of the information processing apparatus 1201 or a CPU (not shown) of the image forming apparatus 1202 or 1203.

The print data of a copy-forgery-inhibited pattern document that the image forming apparatus 1202 or 1203 receives from the information processing apparatus 1201 includes original data, copy-forgery-inhibited pattern bitmap data, and copy-forgery-inhibited pattern vector data. When receiving the print data (S1301), the image forming apparatus 1202 or 1203 analyzes the resolution of the copy-forgery-inhibited pattern bitmap data (S1302).

Then, it is determined whether the copy-forgery-inhibited pattern bitmap data in the print data can be output without converting the resolution (S1303).

If it is determined that the image forming apparatus 1202 or 1203 can output it, the image forming apparatus 1202 or 1203 combines the original bitmap data and the copy-forgery-inhibited pattern bitmap data and prints it (S1304).

For example, if the image forming apparatus 1202 receives data having a resolution of 1200 dpi from the information processing apparatus 1201, the data can be output. Therefore, the image forming apparatus 1202 combines the original bitmap data and the copy-forgery-inhibited pattern bitmap data and prints it.

If the image forming apparatus 1202 or 1203 determines that the data cannot be output, it generates copy-forgery-inhibited pattern bitmap data having a resolution that allows output from the copy-forgery-inhibited pattern vector data (S1305).

For example, if the image forming apparatus 1203 receives data having a resolution of 1200 dpi, the data cannot be output. Therefore, the image forming apparatus 1203 generates copy-forgery-inhibited pattern bitmap data having a resolution that allows output from the copy-forgery-inhibited pattern vector data.

Then the generated original bitmap data and the generated copy-forgery-inhibited pattern bitmap data are combined and printed (S1306).

This prevents incorrect printing of the copy-forgery-inhibited pattern due to a difference in resolution.

That is, the copy-forgery-inhibited pattern can be changed depending on the conditions of the destination apparatus.

However, when transmitting a copy-forgery-inhibited pattern document that is temporarily stored in one image forming apparatus to another image forming apparatus or the information processing apparatus, this method performs editing, such as deleting copy-forgery-inhibited pattern bitmap data or copy-forgery-inhibited pattern vector data from the print data of the copy-forgery-inhibited pattern document. This has the possibility of transmitting only original data of a confidential document whose duplication should be inhibited using a copy-forgery-inhibited pattern to any persons having no right.

To prevent it, as disclosed in Japanese Patent Laid-Open No. 2007-166303, there is a method for forcing an image forming apparatus to combine an original and a copy-forgery-inhibited pattern always when transmitting copy-forgery-inhibited image data, such as a copy-forgery-inhibited pattern document, to an information processing apparatus.

In printing by the above-described known method for controlling a copy-forgery-inhibited pattern document, the information processing apparatuses makes an authentication, and as a result, the information processing apparatus determines whether to generate the print data of only the original, or print data in which the original and the copy-forgery-inhibited pattern are combined, and transmits it to the image forming apparatus.

However, with the method of storing the print data in which the original and the copy-forgery-inhibited pattern are combined by the image forming apparatus in the image forming apparatus, it is difficult to again separate the print data into the original data and the copy-forgery-inhibited pattern data in the image forming apparatus.

As described above, with the method of forcing the image forming apparatus to always combine the original and the copy-forgery-inhibited pattern when transmitting a copy-forgery-inhibited pattern document to the information processing apparatus, image data in which the original and the copy-forgery-inhibited pattern are combined is transmitted also to a document owner, who is a creator, who desires to obtain only the original.

Here, data to which the original is to be combined is not limited to the copy-forgery-inhibited pattern document.

This poses the problem of limiting the convenience of the document owner.

SUMMARY OF THE INVENTION

The present invention solves the above-described problems.

An image forming apparatus according to an aspect of the present invention includes a storage unit configured to store original data; a determining unit configured to determine whether or not a user who gives an instruction to transmit the original data to another apparatus is the creator of the original data when the original data is transmitted to the other apparatus; and a transmitting unit configured, as a result of the determination by the determining unit, if the user is the creator of the original data, to transmit the original data in a data format that allows editing by the other apparatus; and if the user is not the creator of the original data, to transmit the original data in a data format that disables editing by the other apparatus.

Furthermore, the present proposition solves the above-described problems when an image forming apparatus outputs a copy-forgery-inhibited pattern document stored in a storage region of the image forming apparatus, as an electronic file, to an information processing apparatus connected thereto over a network.

That is, when a copy-forgery-inhibited pattern document stored as a copy-forgery-inhibited pattern document in the storage region of the image forming apparatus is transmitted to the information processing apparatus, the file format is changed depending on the right of a user who gives a transmission instruction.

Specifically, depending on the right of the user, the copy-forgery-inhibited pattern document is transmitted as a data-format file before being bitmapped so that it can be edited by the information processing apparatus.

Alternatively, the copy-forgery-inhibited pattern data and the original data of the copy-forgery-inhibited pattern document are transmitted as an image-data-format file in which the copy-forgery-inhibited pattern data cannot be edited by the information processing apparatus.

According to the aspect of the present invention, when an apparatus outputs a document to another apparatus as an electronic file, the format of the file can be changed depending on whether or not the user who gives the transmission instruction is the owner of the document.

That is, it can be determined depending on the user whether the document is transmitted in a data format that allows editing by the other apparatus or in a data format that disables editing by the other apparatus.

This allows effective security of a document to be achieved with a simple configuration.

Further features of the present invention will become apparent from the following description of exemplary embodiments (with reference to the attached drawings).

BRIEF DESCRIPTION OF THE DRAWINGS

FIG. 15 is a flowchart showing processing for a copy-forgery-inhibited pattern document by a server unit.

DESCRIPTION OF THE EMBODIMENTS

First Embodiment

The configuration of an image forming system and the flow of the process, which are premises of the present invention, will be described hereinbelow.

Figure 1:
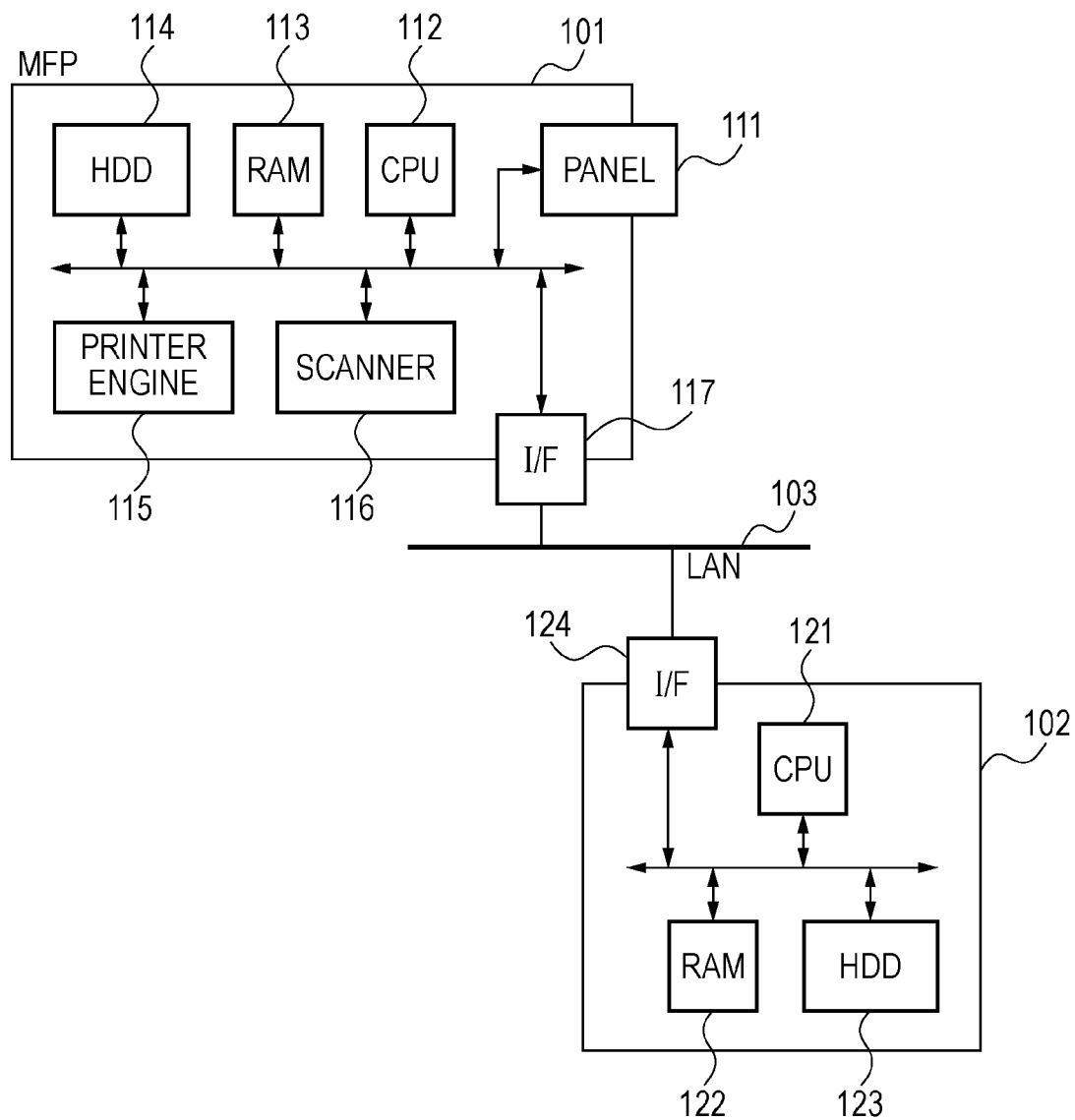
FIG. 1 is a diagram showing the system configuration of an image forming system.

Referring to FIG. 1, an image forming apparatus 101 and an information processing apparatus 102 are connected over a network, such as a LAN 103.

The image forming apparatus (MFP: multi function peripheral) 101 will be described.

A panel 111 is an operating section for a user to perform various settings of the image forming apparatus 101.

A CPU 112 controls over the processing of the image forming apparatus 101.

A RAM 113 is used as a work area of the CPU 112 and is also used as a data storage.

A hard disk drive (HDD) 114 stores software, document data, etc. A printer engine 115 forms received image data on an output sheet.

A scanner 116 optically reads printed matter to generate an electronic image. A communication interface (I/F) 117 exchanges data with other apparatuses over the LAN 103.

The information processing apparatus 102 will be described.

A CPU 121 controls over the processing of the information processing apparatus 102.

A RAM 122 is used as a work area of the CPU 121 and is also used as a data storage.

A hard disk drive (HDD) 123 stores software, data, etc.

A communication interface 124 exchanges data with other apparatuses over the LAN 103.

Figure 2:
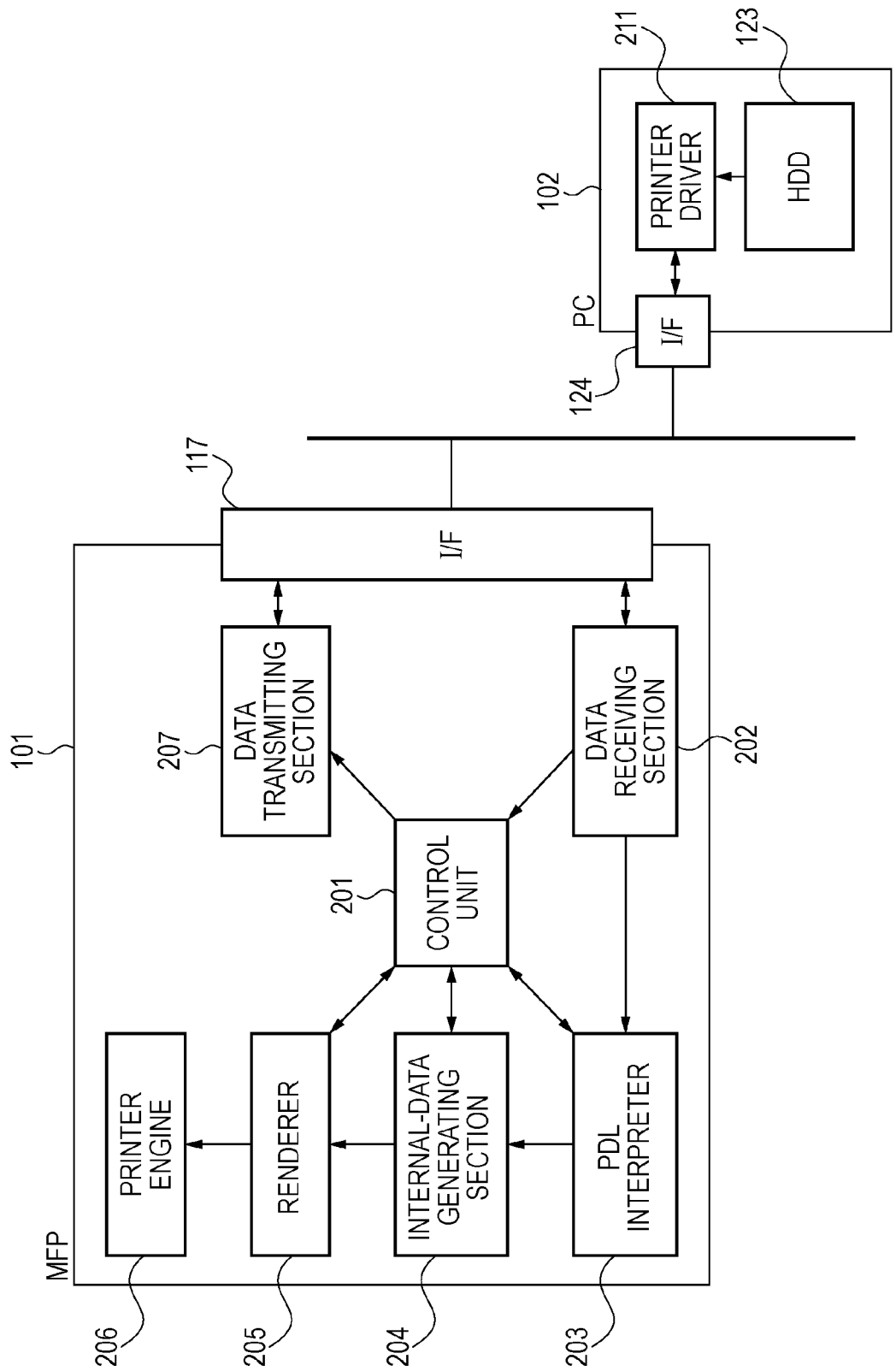
FIG. 2 is a conceptual diagram showing software and hardware of the image forming system.

FIG. 2 shows a conceptual diagram of software modules and hardware modules present in the image forming system.

First, a conceptual diagram of software modules and hardware modules in the image forming apparatus 101 will be described.

They are controlled by the CPU 112.

A data receiving section 202 receives data from an external unit through the communication interface 117.

A data transmitting section 207 transmits data from an external unit connected to the LAN 103 through the communication interface 117.

A PDL analyzing section (interpreter) 203 interprets received print data. An internal-data generating section 204 generates internal (intermediate language) data based on the interpretation.

A renderer 205 expands the internal data to a bitmap format to generate image data. A control unit 201 performs processes including copy-forgery-inhibited pattern document control using access right according to the present invention, described below.

Next, a conceptual diagram of software modules and hardware modules in the information processing apparatus 102 will be described.

They are controlled by the CPU 121.

The hard disk drive (HDD) 123 or the RAM 122, shown in FIG. 1, stores data. The data can be printed by a printer driver 211.

Figure 3:
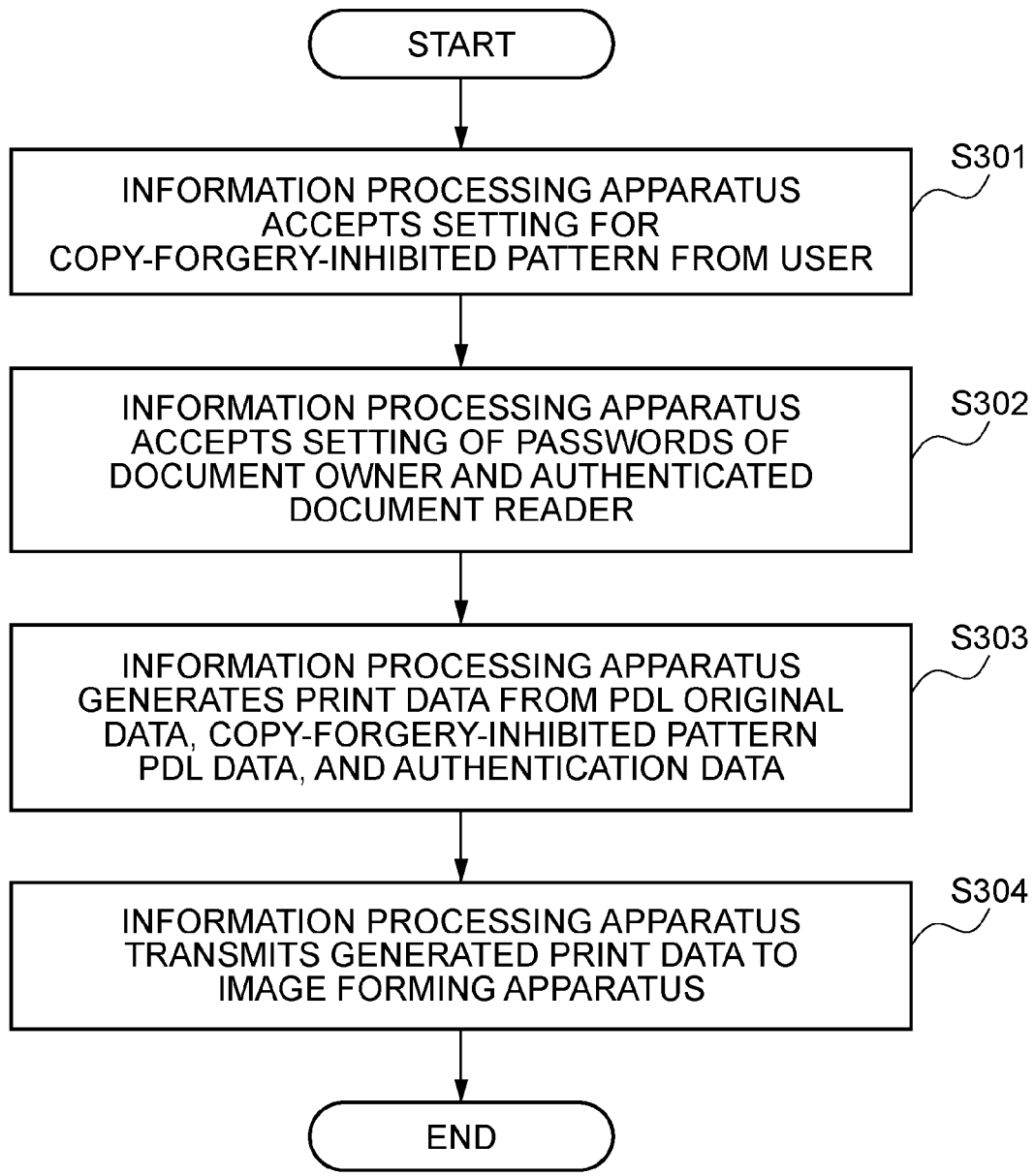
FIG. 3 is a flowchart for generating a copy-forgery-inhibited pattern document in an information processing apparatus.

FIG. 3 shows a flowchart for transmitting an original to which a copy-forgery-inhibited pattern is to be set from the information processing apparatus 102 to the image forming apparatus 101.

All the operations in the flowchart are controlled by the CPU 121 in the information processing apparatus 102.

The information processing apparatus 102 accepts setting for a copy-forgery-inhibited pattern to the original from a user on a print setting screen (S301).

The information processing apparatus 102 accepts setting of the password of a document owner who is the creator of the original and the password of an authenticated document reader from the user on the print setting screen (S302).

Figure 6:
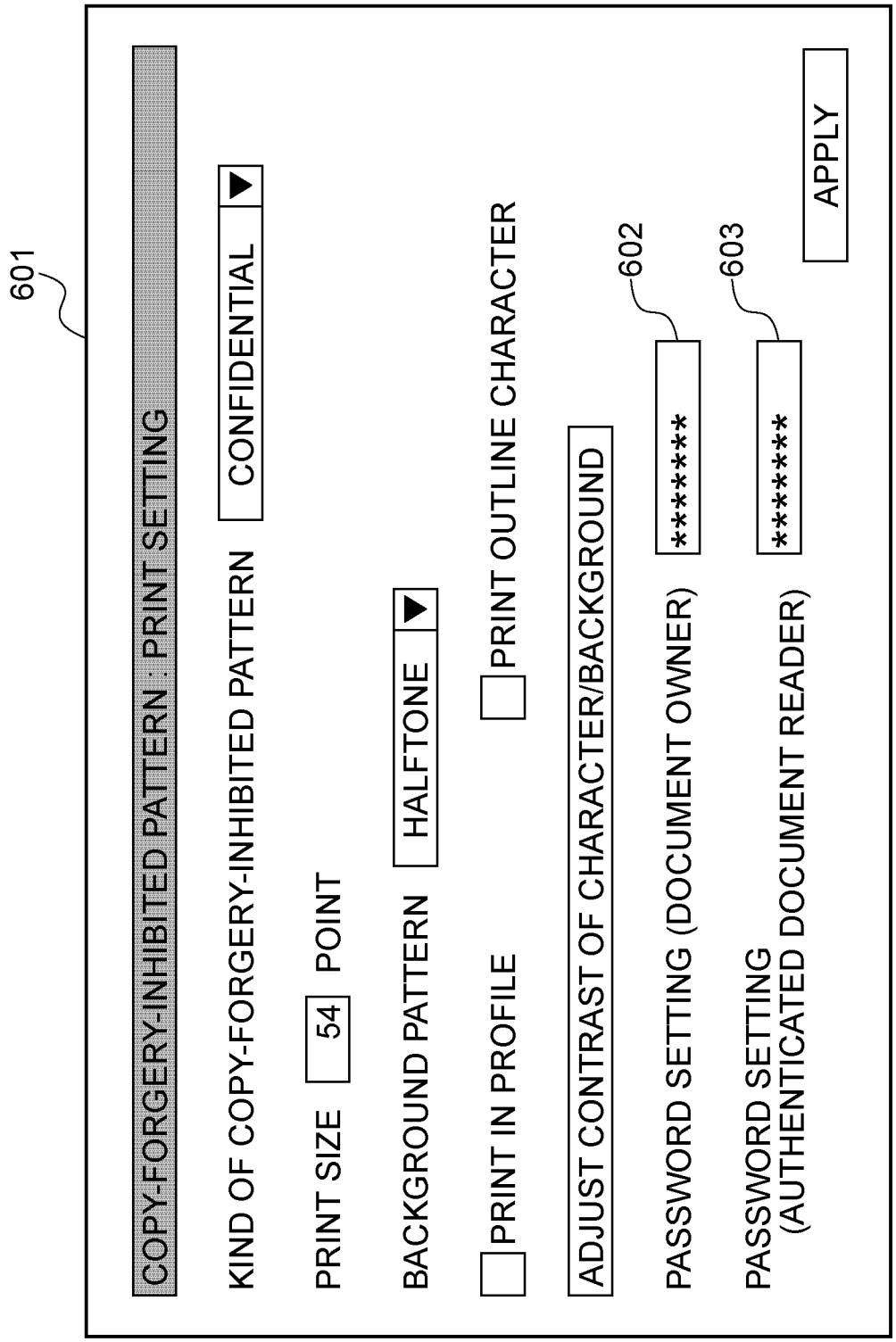
FIG. 6 is a diagram showing an operating section for setting a copy-forgery-inhibited pattern in the document data by the image forming apparatus.

FIG. 6 shows the configuration of a UI screen 601 of the information processing apparatus 102 for use in the setting for a copy-forgery-inhibited pattern.

This is the same as that of an operating section panel 111 of the image forming apparatus 101, to be described later.

The screen 601 includes general copy-forgery-inhibited pattern settings, that is, a character string to be printed, the size of the character string, the orientation of the character string, whether to print outline characters, background pattern, adjustment of the contrast of characters/background, etc.

In addition, it includes a document-owner password setting box 602 and an authenticated-document-reader password setting box 603.

The information processing apparatus 102 generates print data from PDL original data, copy-forgery-inhibited pattern PDL data, and authentication data (S303).

The information processing apparatus 102 transmits the generated print data to the image forming apparatus 101 (S304).

Figure 4:
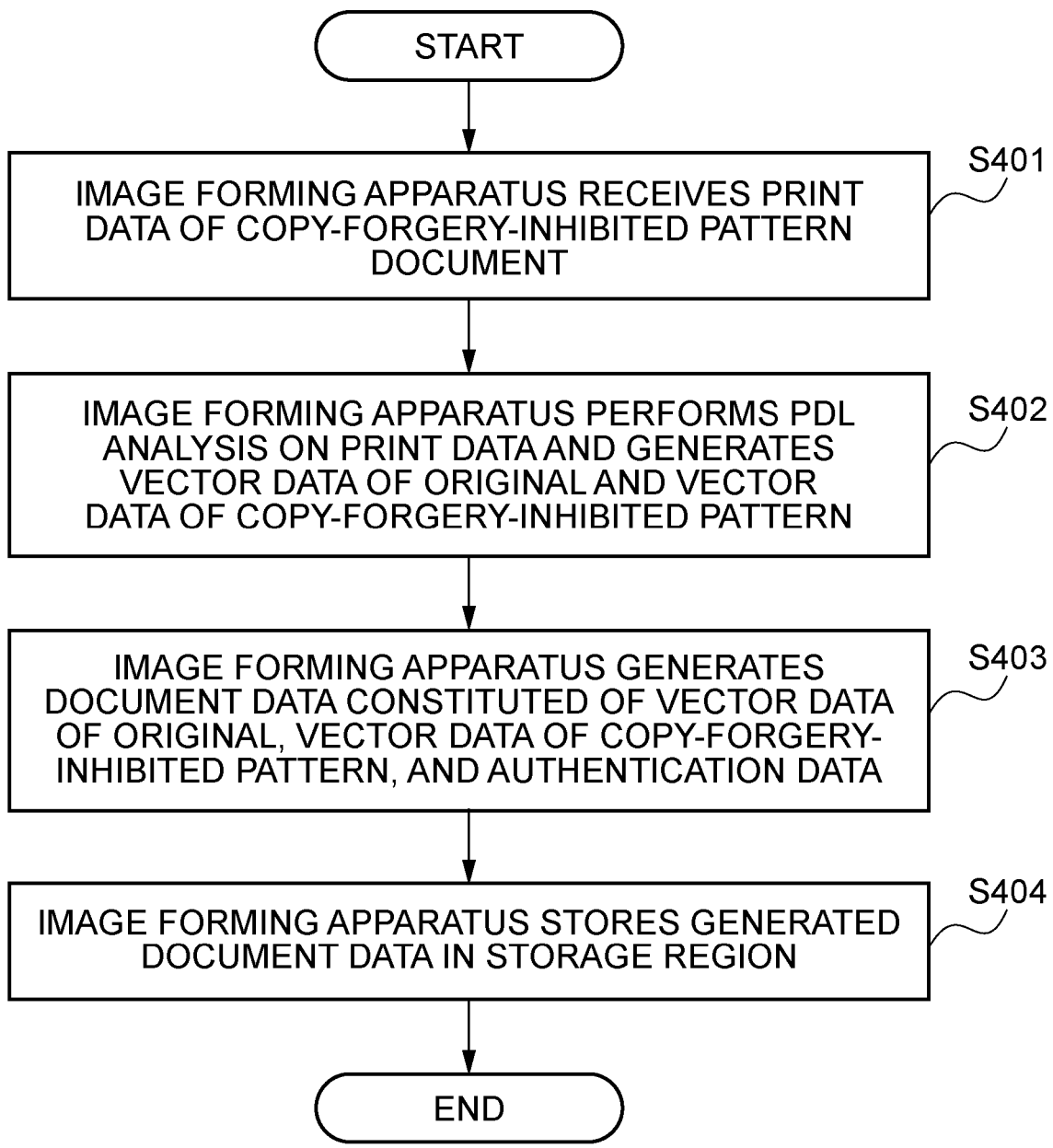
FIG. 4 is a flowchart for an image forming apparatus to store a copy-forgery-inhibited pattern document in a storage region.

FIG. 4 shows a flowchart for the image forming apparatus 101 to store the received print data in the RAM 113 serving as a storage region.

The image forming apparatus 101 receives the print data transmitted from the information processing apparatus 102 (S401).

The image forming apparatus 101 analyzes the PDL data of the received print data and generates the vector data of the original and the vector data of the copy-forgery-inhibited pattern (S402).

The image forming apparatus 101 generates document data constituted of the vector data of the original, the vector data of the copy-forgery-inhibited pattern, and the authentication data (S403).

The image forming apparatus 101 stores the generated document data in the storage region (S404).

Figure 7:
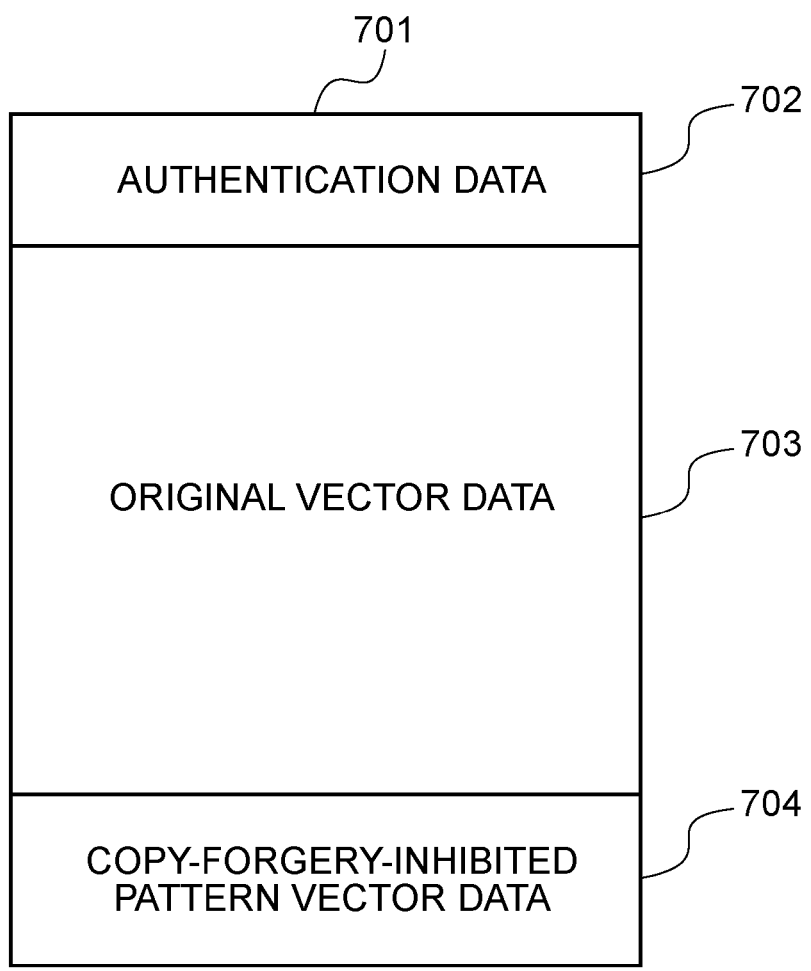
FIG. 7 is a diagram showing the document data stored in the image forming apparatus.

FIG. 7 is a diagram showing the configuration of document data 701 stored in the storage region of the image forming apparatus 101.

The document data 701 stored in the storage region of the image forming apparatus 101 includes original vector data 703 having authentication data 702 and copy-forgery-inhibited pattern vector data 704.

The vector data has a data format for internal processing by the image forming apparatus 101. The original vector data 703 is used for drawing an original, and the copy-forgery-inhibited pattern vector data 704 is used to draw a copy-forgery-inhibited pattern.

The authentication data 702 is used to authenticate access right when the image forming apparatus 101 outputs the document data 701, as an electronic file, to the information processing apparatus 102, such as a PC, with a user operation.

The authentication data 702 includes a password for a document owner and a password for an authenticated document reader.

Figure 8:
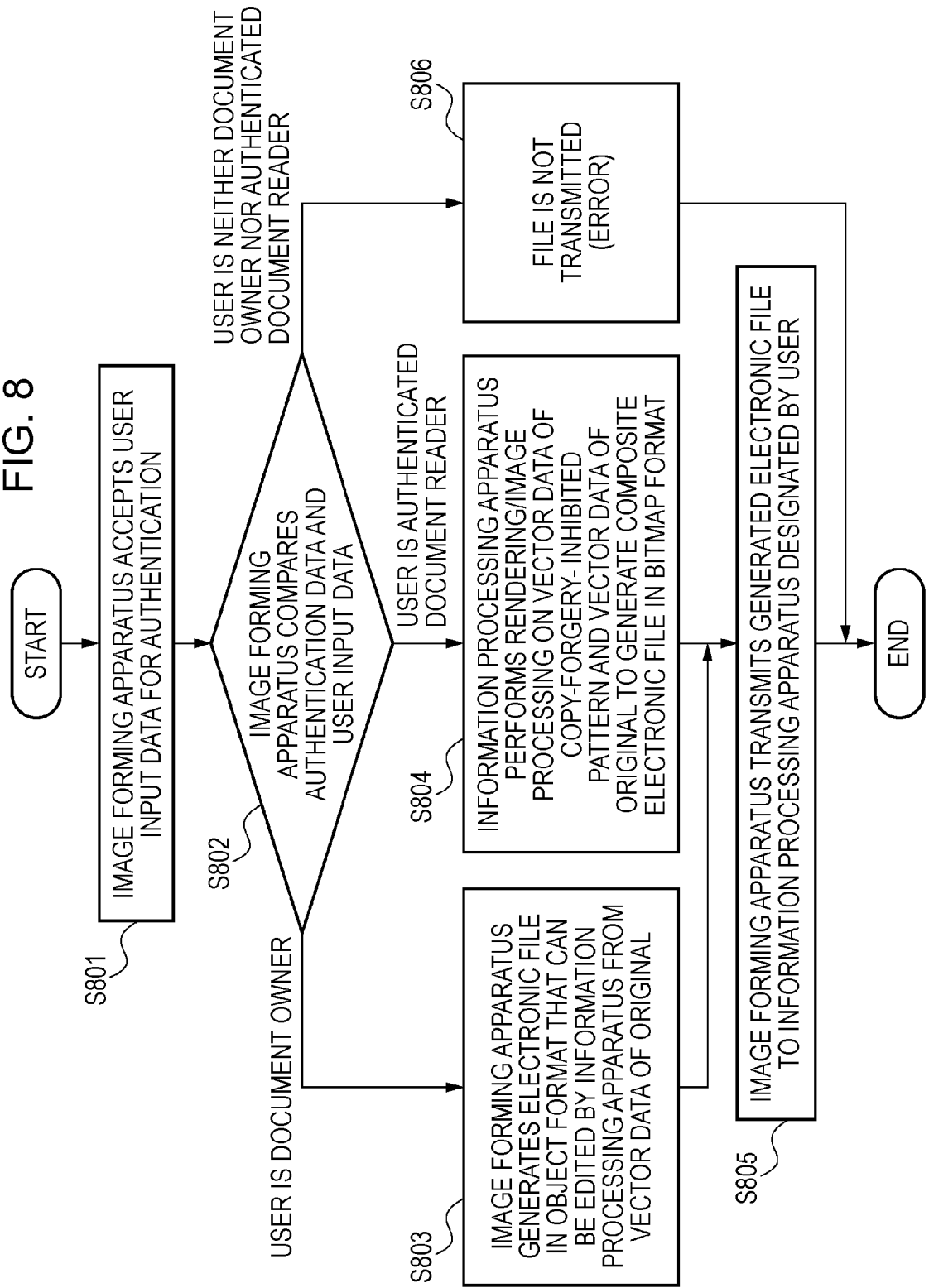
FIG. 8 is a flowchart for processing the copy-forgery-inhibited pattern document by the image forming apparatus.

FIG. 8 shows a flowchart for authentication and outputting document data by the image forming apparatus 101.

The authentication data 702 may include a password other than those of the document owner and the authenticated document reader.

An original to which a copy-forgery-inhibited pattern is to be added does not need to be generated by the information processing apparatus 102, as described above.

Copy-forgery-inhibited pattern setting can also be added to an original stored in the storage region of the image forming apparatus 101.

Figure 5:
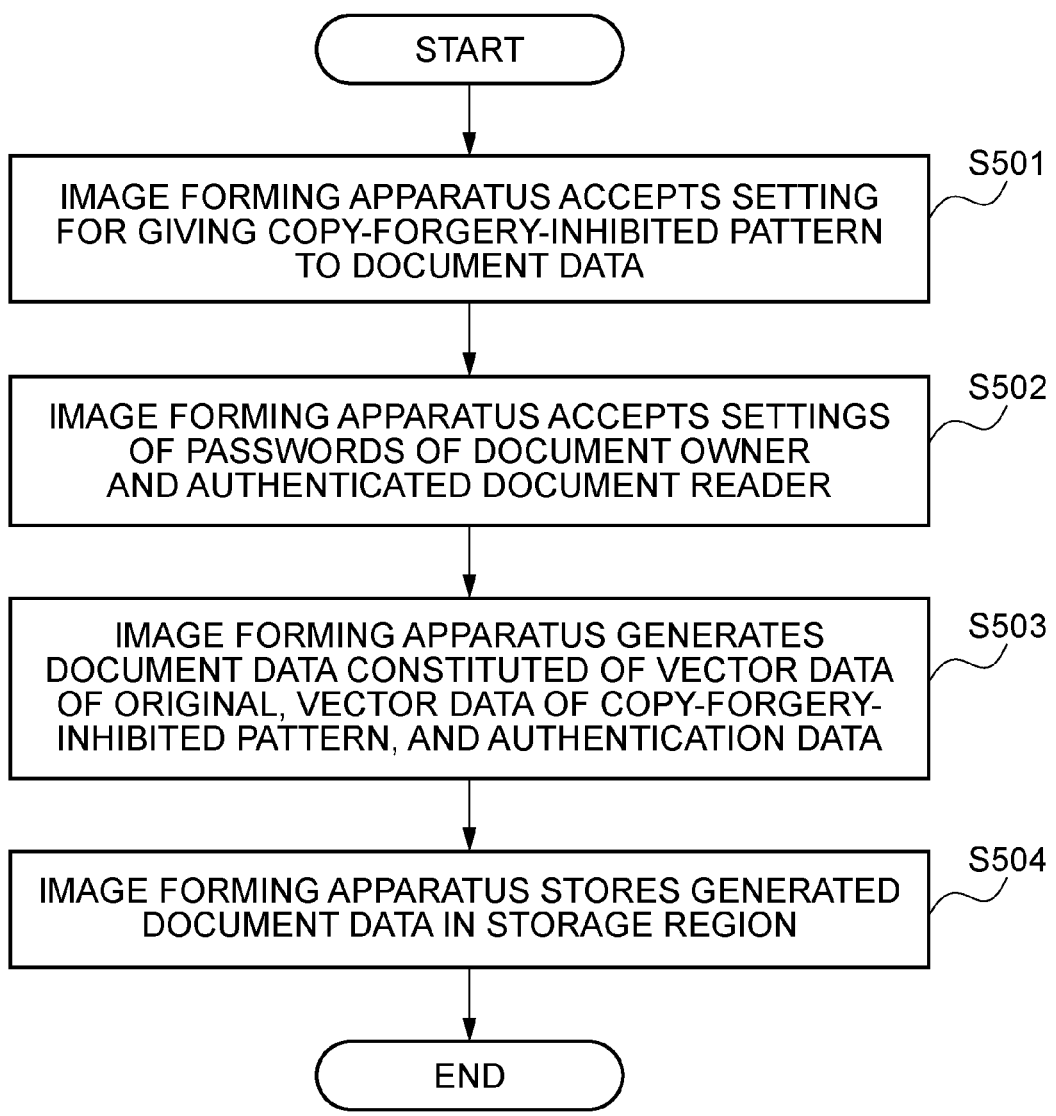
FIG. 5 is a flowchart for the image forming apparatus to set a copy-forgery-inhibited pattern in the document data stored in the storage region.

FIG. 5 shows this case.

FIG. 5 is a flowchart for the image forming apparatus 101 to set a copy-forgery-inhibited pattern to the document data of an original stored in the storage region.

The image forming apparatus 101 accepts setting for adding a copy-forgery-inhibited pattern (S501).

Information to be set includes general copy-forgery-inhibited pattern settings.

For example, a character string to be printed, the size of the character string, the orientation of the character string, whether to print outline characters, background pattern, adjustment of the contrast of characters/background, etc.

In addition to the copy-forgery-inhibited pattern settings, the image forming apparatus 101 accepts the password of a document owner and the password of an authenticated document reader (S502).

FIG. 6, described above, shows the operating section of the image forming apparatus 102 for use in such copy-forgery-inhibited pattern setting. The image forming apparatus 102 generates the vector data 704 of a copy-forgery-inhibited pattern according to the received copy-forgery-inhibited pattern setting.

Furthermore, the image forming apparatus 101 generates the document data 701 constituted of the original vector data 703, the copy-forgery-inhibited pattern vector data 704, and the authentication data 702 (S503).

The image forming apparatus 101 stores the generated document data 701 in the storage region (S504).

FIG. 8 shows a flowchart for the image forming apparatus 101 to transmit a copy-forgery-inhibited pattern document to the information processing apparatus 102.

The storage region of the image forming apparatus 101 stores the document data 701.

If the transmitted document data 701 has authentication data 702, the image forming apparatus 101 accepts the input data from the user for authentication (S801).

The image forming apparatus 101 compares the authentication data 702 in the document data 701 with the user input data (S802). Thus, the right of the user for the document data 701 is verified.

As a result of the right verification, if the image forming apparatus 101 determines that the user input data and the password of the document owner match, the process moves to step S803.

In step S803, the image forming apparatus 101 generates an electronic file in an object format in which the user can edit the original vector data 703 by the information processing apparatus 102.

That is, this allows the information processing apparatus 102 to perform editing, such as separating the original vector data 703 and the copy-forgery-inhibited pattern vector data 704 from each other.

Figure 9:
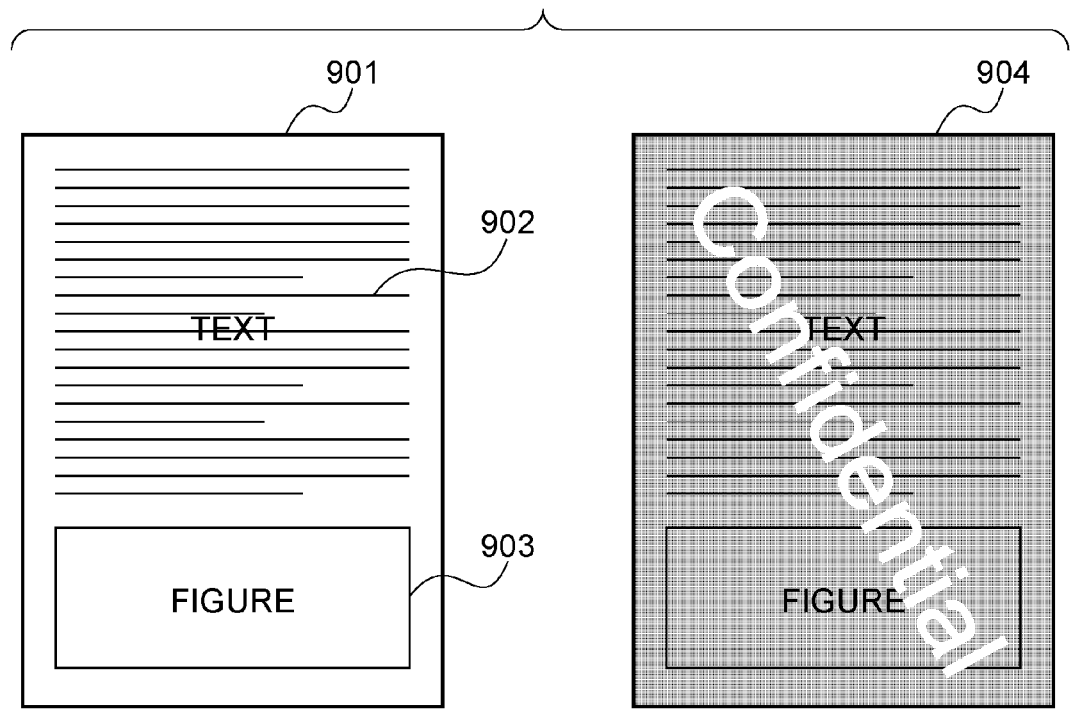
FIG. 9 is a diagram showing an electronic file output by the image forming apparatus.
Figure 10:
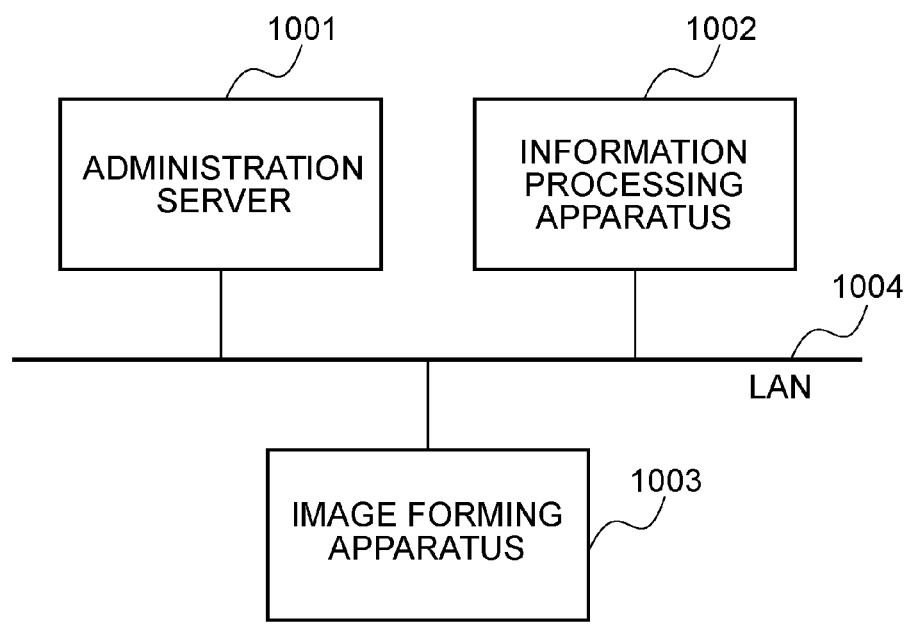
FIG. 10 is a configuration diagram of known copy-forgery-inhibited pattern control using access right.
Figure 11:
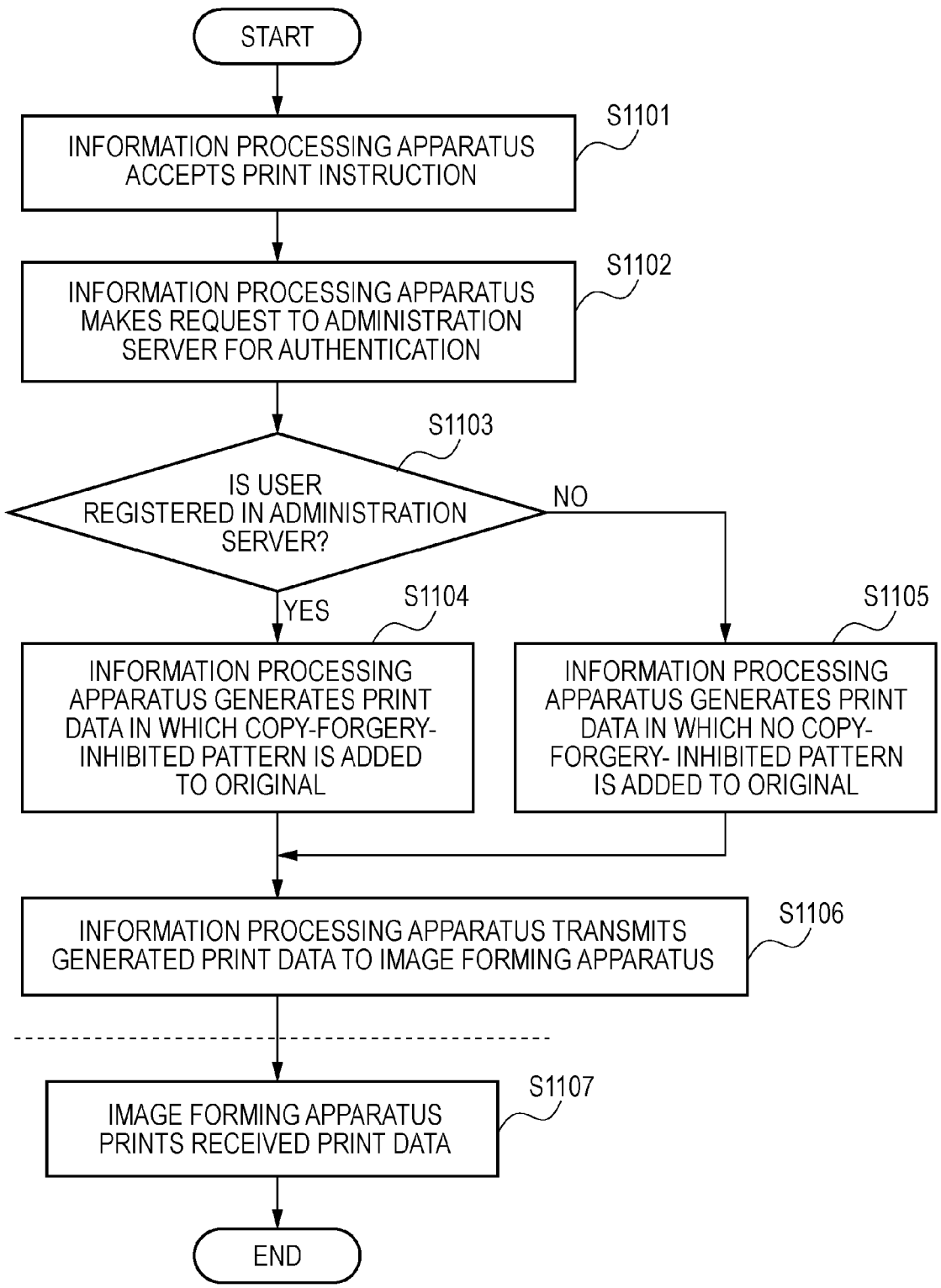
FIG. 11 is a flowchart for the known copy-forgery-inhibited pattern control using access right.
Figure 12:
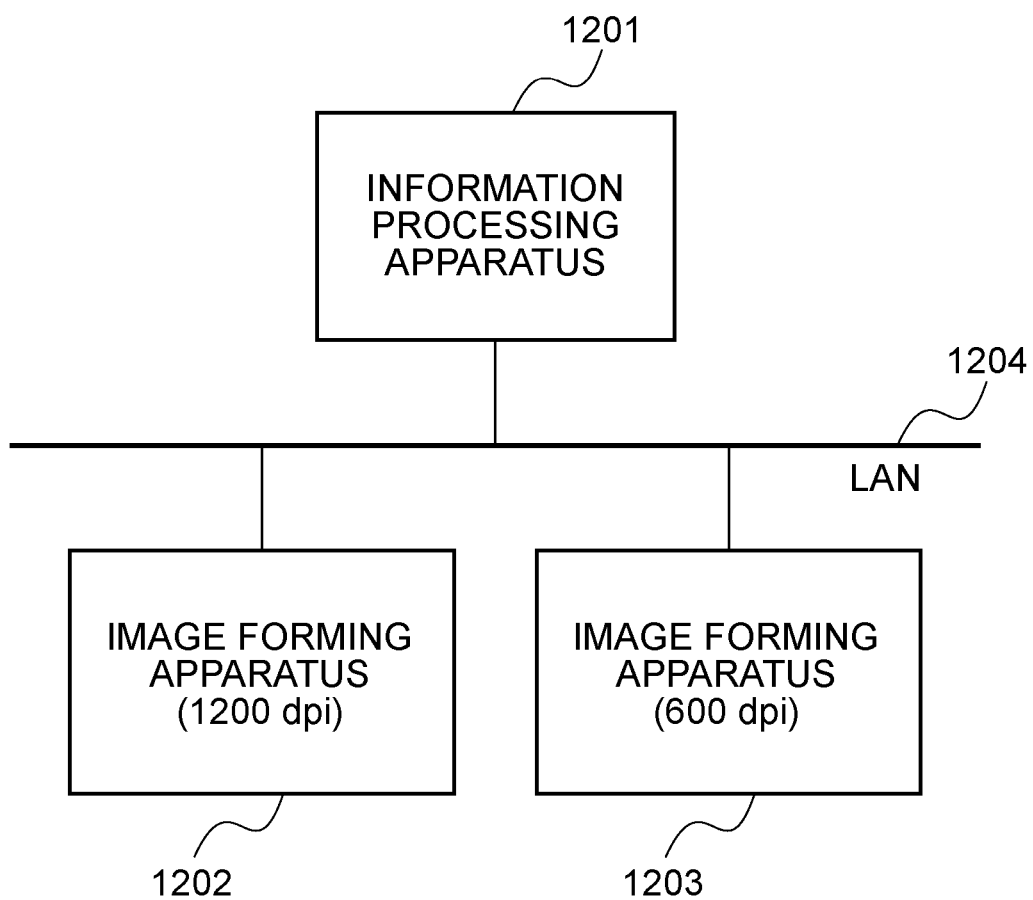
FIG. 12 is a diagram showing a configuration for converting the output format of a copy-forgery-inhibited pattern document in related art.
Figure 13:
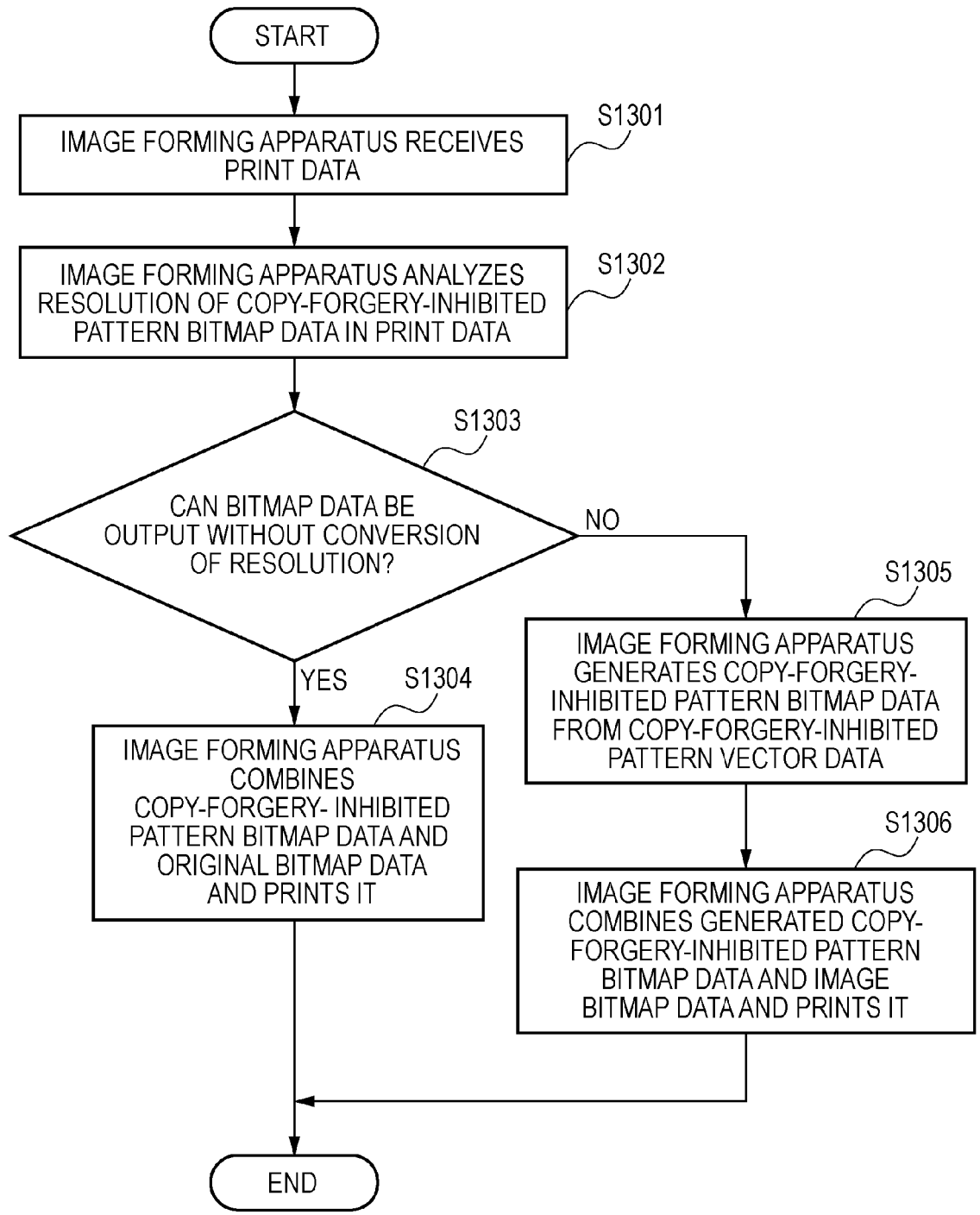
FIG. 13 is a flowchart for converting the output format of a copy-forgery-inhibited pattern document in the relate art.

FIG. 9 shows this electronic file denoted by reference numeral 901.

In the authentication in step S802, if the image forming apparatus 101 determines that the user input data and the password of the authenticated document reader match, the process proceeds to step S804.

In step S804, the image forming apparatus 101 performs rendering and image processing on the copy-forgery-inhibited pattern vector data 704 and the original vector data 703 to generate a composite electronic file in a bitmap format.

In this case, in the information processing apparatus 102, the original data and the copy-forgery-inhibited pattern data are combined on a bitmap. That is, the document data 701 is transmitted to the destination apparatus after being converted to a file format so that the destination apparatus cannot edit the copy-forgery-inhibited pattern data such as that the user removes the copy-forgery-inhibited pattern from the original.

FIG. 9 shows this electronic file denoted by reference numeral 904.

In step S805, the image forming apparatus 101 transmits the electronic file that is generated in a converted format, as described above, to the information processing apparatus 102 designated by the user.

In the authentication in step S802, if the user input data does not match any of the authentication data 702 held in the document data 701, the process proceeds to step S806.

In step S806, the document file is not transmitted to the information processing apparatus 102.

In this case, the image forming apparatus 101 may display that the document file cannot be transmitted because of a mismatch between the passwords on the operating section.

The image forming apparatus 101 can also print the document data 701 stored in the storage region.

FIG. 9 shows document files generated by the image forming apparatus 101.

Reference numeral 901 denotes an electronic file generated in step S803 in FIG. 8 by the image forming apparatus 101. The electronic file 901 is transmitted in a data format that allows editing by the destination apparatus.

The electronic file 901 can be edited by the information processing apparatus 102, such as a PC; for example, the user can edit a text 902 or change a pasted FIG. 903 to another figure.

Reference numeral 904 denotes an electronic file generated in step S804 in FIG. 8 by the image forming apparatus 101.

The electronic file 904 is transmitted to the destination apparatus, with its data format converted to a data format that disables editing by the destination apparatus.

The electronic file 904 is a bitmap-format electronic file in which the original and the copy-forgery-inhibited pattern are combined.

Therefore, even if this electronic file 904 is output to the information processing apparatus 102 such as a PC from the image forming apparatus 101, the user cannot edit the electronic file 904 in the information processing apparatus that received the electronic file 904.

For example, the user cannot alter the original or delete the copy-forgery-inhibited pattern, allowing a certain level of security to be retained as a confidential document.

The electronic file 904 is a so-called general copy-forgery-inhibited pattern document, in which a copy-forgery-inhibited character string, such as "Confidential", embedded in the background stands out when it is duplicated, thereby preventing unauthorized duplication.

Here, the expression that "the copy-forgery-inhibited pattern cannot be edited" means that the copy-forgery-inhibited pattern data cannot be deleted.

Thus, when the image forming apparatus 101 outputs a copy-forgery-inhibited pattern document to the information processing apparatus 102 as an electronic file, the document owner can output the original in a data format in which it can be edited by the information processing apparatus 101 after the authentication.

On the other hand, the authenticated document reader can obtain an electronic file in an image data format in which the original and the copy-forgery-inhibited pattern are combined and which cannot be edited by the information processing apparatus 102.

That is, in the case where the person who has given an instruction to output a confidential document to the information processing apparatus 102 is an authenticated document reader, the image forming apparatus 101 outputs the original as an electronic file that is given a copy-forgery-inhibited pattern so as not to be edited.

On the other hand, in the case where the person who gives an instruction to output a confidential document to the information processing apparatus 102 is a document owner, the image forming apparatus 101 outputs the original as an editable electronic file, thus providing safe and practical security.

Furthermore, since the document data stored in the storage region of the image forming apparatus 101 has copy-forgery-inhibited pattern data and the authentication data in addition to the original data, there is no need for an administration server for authentication and a database for storing the copy-forgery-inhibited pattern.

This allows effective security for a copy-forgery-inhibited pattern document to be achieved with a simple configuration.

Second Embodiment

In a second embodiment, a case where a confidential document is stored and output by an information processing apparatus will be described.

The process in the image forming apparatus 101 in the first embodiment is performed in an information processing apparatus.

Figure 14:
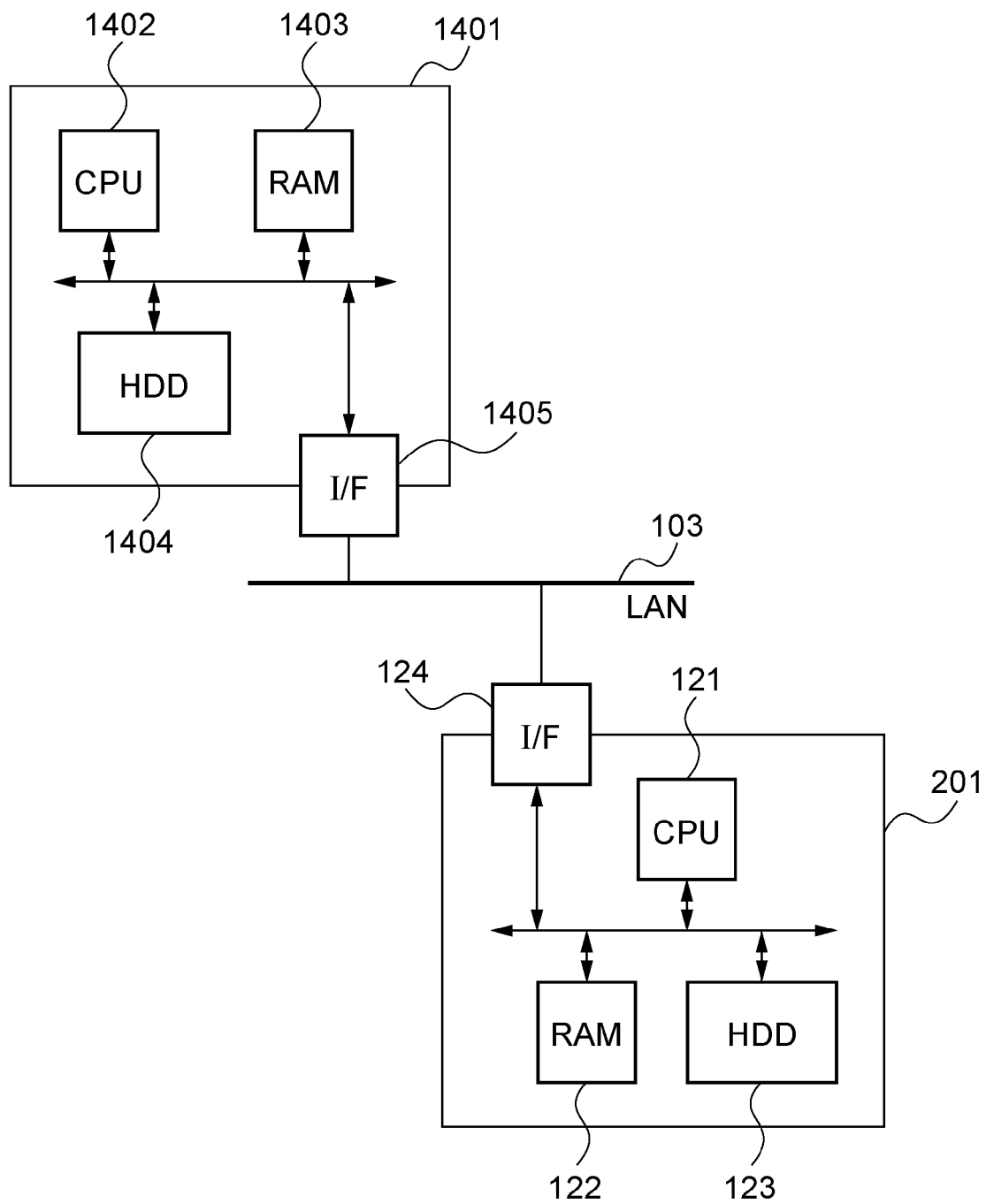
FIG. 14 is a diagram of the system configuration of an image forming system according to a second embodiment.

FIG. 14 shows the configuration of this embodiment. In this embodiment, a server unit 1401, which is an information processing apparatus that holds and outputs a confidential document, and a client unit 201, which is an information processing apparatus that receives the document, are networked over the LAN103 etc.

The server unit 1401 will be described. A CPU 1402 controls over the processing in the server unit 1401. A RAM 1403 is used as a work area of the CPU 1402 and also as a data storage. A hard disk drive (HDD) 1404 stores software, data, etc. A communication interface 1405 exchanges data with other apparatuses over the RAN 103.

The operation of the client unit 201 is the same as that of the information processing apparatus 102 shown in the first embodiment.

FIG. 15 shows a flowchart for the server unit 1401 to transmit a copy-forgery-inhibited pattern document to the client unit 201.

The storage region of the server unit 1401 stores the document data 701. As described in the first embodiment, the document data 701 includes the original vector data 702 having the authentication data 702 and the copy-forgery-inhibited pattern vector data 703. The server unit 1401 accepts input data from the user for authentication when the document data 701 for which a transmission instruction if given has the authentication data 702 (S1501). The server unit 1401 compares the authentication data 702 in the document data 701 with the user input data (S1502).

If the server unit 1401 determines that the user input data and the password of the document owner match, the server unit 1401 generates an electronic file in an object format that the user can edit by the client unit 201 from the original vector data 703 (S1503). FIG. 9 shows this electronic file denoted by reference numeral 901.

In step S1502, if the server unit 1401 determines that the user input data and the password of the authenticated document reader match, the server unit 1401 performs rendering and image processing on copy-forgery-inhibited pattern vector data and original vector data.

That is, the two pieces of data are combined into an electronic file in a bitmap format (S1504). This electronic file is denoted by reference numeral 904 in FIG. 9. The server unit 1401 transmits the generated electronic file 904 to the client unit 201 designated by the user (S1505).

As described above, it is impossible for the client unit 201 to delete the copy-forgery-inhibited pattern data in the electronic file 904.

In the authentication in step S1503, if the user input data does not match any of the authentication data 702 in the document data, the document file is not transmitted to the client unit 201 (S1506).

In this case, the client unit 201 may display that the document file cannot be transmitted because of a mismatch between the passwords on the screen.

Thus, when the server unit 1401 outputs a copy-forgery-inhibited pattern document to the client unit 201 as an electronic file, the document owner can output the original in a data format that can be edited by the client unit 201 after the authentication.

On the other hand, the authenticated document reader can obtain an electronic file in an image data format in which the original and the copy-forgery-inhibited pattern are combined and which cannot be edited by the client unit 201.

That is, in the case where the person who has given an instruction to output a confidential document to the client unit 201 is an authenticated document reader, the server unit 1401 outputs an electronic file that is given a copy-forgery-inhibited pattern so as not to be edited to the client unit 201.

On the other hand, in the case where the person who has given an instruction to output the confidential document to the client unit 201 is a document owner, the server unit 1401 outputs an editable electronic file to the client unit 201.

Thus, safe and practical security can be provided.

Since the document data stored in the storage region of the server unit 1401 holds the copy-forgery-inhibited pattern data and the authentication data in addition to the original data, there is no need for an administration server for authentication and a database for storing the copy-forgery-inhibited pattern.

This allows effective security for a copy-forgery-inhibited pattern document to be achieved with a simple configuration.

Other Embodiments

The above-described embodiments also include a method for storing programs for operating the configurations of the above-described embodiments in a storage medium to achieve the functions of the embodiments, reading the programs stored in the storage medium as codes, and executing them in a computer. Not only the storage medium in which the programs are stored and the programs themselves are included in the embodiments.

Examples of such a storage medium is a floppy (a registered trademark) disk, a hard disk, an optical disk, a magneto-optical disk, a CD-ROM, magnetic tape, a non-volatile memory card, and a ROM.

The above-described embodiments also include not only the above-described processing using only the programs stored in the storage medium, but also operating on an OS in cooperation with the function of another software or expansion board to execute the operations of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-162303 filed Jun. 20, 2008, which is hereby incorporated by reference herein in its entirety.

What is claimed is:

1. A method for controlling an image forming apparatus, the method comprising:

storing document data including original data having authentication data and copy-forgery-inhibited pattern data in a storage region, the original data and the copy-forgery-inhibited pattern data being vector data;

comparing the right of a user who gives an instruction to transmit the document data to an information processing apparatus with the authentication data when transmitting the document data; and transmitting the original data as the vector data being separated from the copy-forgery-inhibited pattern data, as the vector data to the information processing apparatus in a case where the user has a right as a document owner as a result of the comparison, and to combine the copy-forgery-inhibited pattern data as the vector data and, the original data as the vector data, and transmit the combined data as data in an image data format to the information processing apparatus in a case where the user has a right as an authenticated document reader as the result of the comparison, the copy-forgery-inhibited pattern data in the data in the image data format being unable to be deleted at the information processing apparatus.

2. The method for controlling the image forming apparatus according to claim 1, wherein the data in the image data format with the copy-forgery-inhibited pattern image being unable to be deleted at the information processing apparatus is bitmap-format data.

3. An image forming apparatus comprising:

a storage unit that stores document data including original data having authentication data and copy-forgery-inhibited pattern data in a storage region, the original data and the copy-forgery-inhibited pattern data being vector data;

a right verifying unit configured to compare a right of a user who gives an instruction to transmit the document data to an information processing apparatus with the authentication data when transmitting the document data; and a transmitting unit configured to transmit the original data as the vector data being separated from the copy-forgery-inhibited pattern data, as the vector data to the information processing apparatus in a case where the user has a right as a document owner as a result of the comparison by the right verifying unit, and to combine the copy-forgery-inhibited pattern data as the vector data and, the original data as the vector data, and transmit the combined data as data in an image data format to the information processing apparatus in a case where the user has a right as an authenticated document reader as the result of the comparison by the right verifying unit, the copy-forgery-inhibited pattern data in the data in the image data format being unable to be deleted at the information processing apparatus.

4. The image forming apparatus according to claim 3, wherein the data in the image data format with the copy-forgery-inhibited pattern image being unable to be deleted at the information processing apparatus is bitmap-format data.

5. A non-transitory computer-readable medium that stores a computer-executable process for directing a computer to perform a method comprising:

storing document data including original data having authentication data and copy-forgery-inhibited pattern data in a storage region, the original data and the copy-forgery-inhibited pattern data being vector data;

comparing the right of a user who gives an instruction to transmit the document data to an information processing apparatus with the authentication data when transmitting the document data; and transmitting the original data as the vector data being separated from the copy-forgery-inhibited pattern data, as the vector data to the information processing apparatus in a case where the user has a right as a document owner as a result of the comparison, and to combine the copy-forgery-inhibited pattern data as the vector data and, the original data as the vector data, and transmit the combined data as data in an image data format to the information processing apparatus in a case where the user has a right as an authenticated document reader as the result of the comparison, the copy-forgery-inhibited pattern data in the data in the image data format being unable to be deleted at the information processing apparatus.

* * * * *